US011866203B2

United States Patent
Strickland et al.

(10) Patent No.: US 11,866,203 B2
(45) Date of Patent: Jan. 9, 2024

(54) DUST REMOVAL IN DEEP SPACE ENVIRONMENT

(71) Applicant: Hamilton Sundstrand Corporation, Charlotte, NC (US)

(72) Inventors: Julie Strickland, Houston, TX (US); Nicholas Brophy, Bentonville, AR (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 581 days.

(21) Appl. No.: 17/060,336

(22) Filed: Oct. 1, 2020

(65) Prior Publication Data

US 2022/0106061 A1    Apr. 7, 2022

(51) Int. Cl.
*B64G 1/46* (2006.01)
*B03C 3/155* (2006.01)
*B64G 6/00* (2006.01)

(52) U.S. Cl.
CPC ............... *B64G 1/46* (2013.01); *B03C 3/155* (2013.01); *B64G 6/00* (2013.01)

(58) Field of Classification Search
CPC ... B64G 1/52; B64G 1/46; B64G 1/60; B64G 1/12; B64G 6/00; B64G 1/22; B03C 3/155; B08B 7/0035; B08B 13/00; B08B 5/02; B08B 3/026; B08B 7/04; B08B 15/02
See application file for complete search history.

(56) References Cited

U.S. PATENT DOCUMENTS

| 3,158,457 A | 11/1964 | Whitfield |
| 3,616,624 A | 11/1971 | Marsh |
| 4,713,724 A | 12/1987 | Voelkel |
| 5,980,614 A | 11/1999 | Loreth et al. |
| 5,993,521 A | 11/1999 | Loreth et al. |
| 6,076,216 A | 6/2000 | Biryukov |

(Continued)

FOREIGN PATENT DOCUMENTS

| CN | 106248573 A | 12/2016 |
| CN | 107942749 A | 4/2018 |

OTHER PUBLICATIONS

Agui et al., "NASA Lunar Dust Filtration and Separations Workshop Report", XP055885554, Dec. 1, 2009, pp. 1-35, retrieved from the internet: https://ntrs.nasa.gov/api/citations/20100004823/downloads/20100004823.pdf.

(Continued)

*Primary Examiner* — Christopher P Jones
*Assistant Examiner* — Sonji Turner
(74) *Attorney, Agent, or Firm* — CANTOR COLBURN LLP

(57) ABSTRACT

Systems and methods to remove dust from an extravehicular mobility unit (EMU) worn by an astronaut in a deep space environment involve one or more ionic shower units installed external to an interior volume of a facility. Each ionic shower unit releases positively charged ions and negatively charged ions in a specified direction to neutralize the dust and generate neutralized dust. The interior volume of the facility is defined by an interior hatch that is separated from an exterior hatch by an airlock. One or more collection units is installed external to the interior volume. Each collection unit traps the neutralized dust to prevent the dust from entering the interior volume.

20 Claims, 6 Drawing Sheets

(56) References Cited

U.S. PATENT DOCUMENTS

| | | | |
|---|---|---|---|
| 6,740,144 B2 | 5/2004 | Conrad et al. | |
| 7,052,531 B2 | 5/2006 | Kishioka | |
| 7,074,261 B2 | 7/2006 | Murphy | |
| 8,398,745 B2* | 3/2013 | Yamawaku | H01L 21/67017 95/71 |
| 9,040,008 B2 | 5/2015 | Zahedi | |
| 9,849,463 B2 | 12/2017 | Peczalski et al. | |
| 10,766,039 B2 | 9/2020 | Yuge et al. | |
| 2002/0134399 A1 | 9/2002 | Taylor | |
| 2008/0060101 A1 | 3/2008 | Cadogan | |
| 2010/0236406 A1* | 9/2010 | Yamawaku | H01L 21/67017 96/16 |
| 2016/0059276 A1* | 3/2016 | Yan | B08B 5/02 15/1.51 |

OTHER PUBLICATIONS

Anonymous "Elektrostatik entfernen", Nov. 12, 2018, pp. 1-6, retrieved from the internet: https://web.archive.org/web/20181112034851/http://ww.haug.de/index.html.

Cain, John R. "Lunar Dust: The Hazard and Astronaut Exposure Risks", Earth Moom Planets, 2010, pp. 107-125.

Extended European Search Report for EP Application No. 21200189.5, dated Feb. 11, 2022, pp. 1-12.

Canham, John S. "Lunar and Planetary Dust Mitigation Design", 2019 NASA Contamination, Coatings, Materials, and Planetary Protection (CCMPP) Workshop hosted virtually via WebEx on Nov. 6 and 7, 2019, pp. 1-18.

Christoffersen et al., "Lunar Dust Effects on Spacesuit Systems: Insights from the Apollo Spacesuits", NASA/TP, 2008, pp. 1-47.

Energy Education "Electrostatic precipitator", pp. 1-2, retrieved Sep. 9, 2020, retrieved from the internet https://energyeducation.ca/encyclopedia/Electrostatic_precipitator.

EPA.gov "Monitoring by Control Technique—Electrostatic Precipitators", pp. 1-5, retrieved Sep. 9, 2020, retrieved from the internet https://www.epa.gov/air-emissions-monitoring-knowledge-base/monitoring-control-technique-electrostatic-precipitators.

Gaier et al., "Implications of Adhesion Studies for Dust Mitigation on Thermal Control Surfaces", NASA/TM, 2012, pp. 1-23.

Krasnoholovets et al., "Motion of a particle and the vacuum", Physics Essays, vol. 6, No. 4, 1993, pp. 554-563.

Manyapu et al., "Self-cleaning spacesuits for future planetary missions using carbon nanotube technology", Acta Astronautica, 2019, pp. 134-144.

Muzyukin et al., "On the nature of charged particle flow of vacuum arc", 14th International Conference "Gas Discharge Plasmas and Their Applications" Journal of Physics: Conference Series, 2019, pp. 1-11.

Sung et al., "Ultrafine particle cleaning performance of an ion spray electrostatic air cleaner emitting zero ozone with diffusion charging by carbon fiber", Building and Environment, vol. 166, Dec. 2019, pp. 1-2 (Abstract only).

Wikipedia "Air ioniser", pp. 1-4, retrieved Aug. 24, 2020, retrieved from the internet https://en.wikipedia.org/wiki/Air_ioniser.

Wikipedia "Electrostatic precipitator", pp. 1-12, retrieved Aug. 24, 2020, retrieved from the internet: https://en.wikipedia.org/wiki/Electrostatic_precipitator.

Woodford, Chris "Electrostatic smoke precipitators", pp. 1-5, retrieved Sep. 9, 2020, retrieved from the internet https://www.explainthatstuff.com/electrostaticsmokeprecipitators.html.

* cited by examiner

DUST REMOVAL IN DEEP SPACE ENVIRONMENT

BACKGROUND

Exemplary embodiments pertain to the art of space exploration and, in particular, to dust removal in a deep space environment.

Extravehicular activity on the surface of a planet explored by astronauts (e.g., lunar surface) results in dust (e.g., lunar dust) coating the surface of an extravehicular mobility unit (EMU) (i.e., space suit) worn by the astronauts. If brought into the space vehicle, the dust can negatively affect both the vehicle components and the crew members. The dust can settle in electronics and cause malfunctions. In addition, lunar dust, for example, has been found to cause scar tissue in lungs and may be linked with brain cancer, and Martian dust has been found to be toxic.

BRIEF DESCRIPTION

In one embodiment, a system to remove dust from an extravehicular mobility unit (EMU) worn by an astronaut in a deep space environment includes one or more ionic shower units installed external to an interior volume of a facility. Each ionic shower unit releases positively charged ions and negatively charged ions in a specified direction to neutralize the dust and generate neutralized dust. The interior volume of the facility is defined by an interior hatch that is separated from an exterior hatch by an airlock. One or more collection units installed external to the interior volume traps the neutralized dust to prevent the dust from entering the interior volume.

Additionally or alternatively, in this or other embodiments, the system is located in the airlock between the interior hatch and the exterior hatch of the facility and the facility is a space vehicle or a habitat.

Additionally or alternatively, in this or other embodiments, the system also includes a filter in a space between a raised platform with openings on which the astronaut stands and the floor of the airlock.

Additionally or alternatively, in this or other embodiments, the filter in the space recirculates air and to trap the neutralized dust.

Additionally or alternatively, in this or other embodiments, the one or more ionic shower units or the one or more collection units are installed in a ring-shaped support whose opening is sized to encircle the astronaut.

Additionally or alternatively, in this or other embodiments, the ring-shaped support moves up and down to release the positively charged ions and the negatively charged ions along a length of the EMU or to trap the neutralized dust along the length of the EMU.

Additionally or alternatively, in this or other embodiments, the one or more ionic shower units or the one or more collection units are installed on a swing arm to move around the EMU.

Additionally or alternatively, in this or other embodiments, the one or more ionic shower units or the one or more collection units installed on the swing arm are also configured to move up and down.

Additionally or alternatively, in this or other embodiments, the system is located external to the exterior hatch of the facility.

Additionally or alternatively, in this or other embodiments, the system is affixed to a ladder leading to the external hatch to prevent the dust from entering the airlock.

In another embodiment, a method of removing lunar from an extravehicular mobility unit (EMU) worn by an astronaut in a deep space environment includes installing one or more ionic shower units external to an interior volume of a facility. Each ionic shower unit releases positively charged ions and negatively charged ions in a specified direction to neutralize the dust and generate neutralized dust. The interior volume of the facility is defined by an interior hatch that is separated from an exterior hatch by an airlock. The method also includes installing one or more collection units external to the interior volume. Each collection unit traps the neutralized dust to prevent the dust from entering the interior volume.

Additionally or alternatively, in this or other embodiments, the installing the system includes installing in the airlock between the interior hatch and the exterior hatch of the facility, the facility being a space vehicle or a habitat.

Additionally or alternatively, in this or other embodiments, the method also includes disposing a filter in a space between a raised platform with openings on which the astronaut stands and the floor of the airlock.

Additionally or alternatively, in this or other embodiments, the method also includes configuring the filter to recirculate air and to trap the neutralized dust.

Additionally or alternatively, in this or other embodiments, the installing the one or more ionic shower units or the one or more collection units is in a ring-shaped support whose opening is sized to encircle the astronaut.

Additionally or alternatively, in this or other embodiments, the method also includes configuring the ring-shaped support to move up and down to release the positively charged ions and the negatively charged ions along a length of the EMU or to trap the neutralized dust along the length of the EMU.

Additionally or alternatively, in this or other embodiments, the installing the one or more ionic shower units or the one or more collection units on a swing arm to move around the EMU.

Additionally or alternatively, in this or other embodiments, the method also includes configuring the swing arm to move up and down.

Additionally or alternatively, in this or other embodiments, the installing the system includes installing external to the exterior hatch of the facility.

Additionally or alternatively, in this or other embodiments, the method also includes affixing the system to a ladder leading to the external hatch to prevent the lunar dust from entering the airlock.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, dust on other planets (e.g., lunar dust) is pervasive and may coat the EMU worn by a crew member involved in extravehicular activity on the planetary surface. As also noted, tracking this dust into the space vehicle can be detrimental to both the equipment and the crew. The planetary dust may be electrostatically charged. For example, lunar dust is negatively charged. Dust on mars has been found to include smaller negatively charged particles and larger positively charged particles. Based on the lunar dust being charged, a prior approach to removing lunar dust from the EMU prior to the crew member entering the air lock of the space vehicle involves charged nanoparticles in the EMU itself (i.e., a self-cleaning space suit). However, while the self-cleaning space suit repels lunar dust, the dust is not trapped or captured in any way and, thus, may still come into the space vehicle after the air lock is opened.

Embodiments of the systems and methods detailed herein relate to dust removal in a deep space environment. The dust is not only separated from the EMU but is also captured. This removal of the lunar dust ensures that little to no dust makes its way into the space vehicle. As detailed, an ionic shower unit according to one or more embodiments releases positively charged ions (i.e., cations) and negatively charged ions (i.e., anions). As previously noted, the lunar dust is negatively charged. Thus, the cations from the ionic shower unit neutralize the lunar dust. As also noted, Martian dust may include positively and negatively charged particles. Thus, the cations from the ionic shower neutralize the negatively charged particles while the anions from the ionic shower neutralize the positively charged particles. According to additional embodiments, the dust that is neutralized by the ionic shower unit or is generally neutral is captured by charged plates. Some of the neutralized dust may fall without being captured by the charged plates.

The neutralized dust that falls off the EMU may fall through a false floor in the airlock. Under the false floor, a filter may be used to recirculate the air from the ionic shower unit while storing or disposing of the dust. For example, a high-efficiency particulate air (HEPA) filter, which forces air through a fine mesh to trap the dust, may facilitate recirculating the air while storing the separated dust. This dust may be retained for analysis or ultimately disposed of to reduce weight prior to a subsequent flight of the space vehicle.

Figure 1:
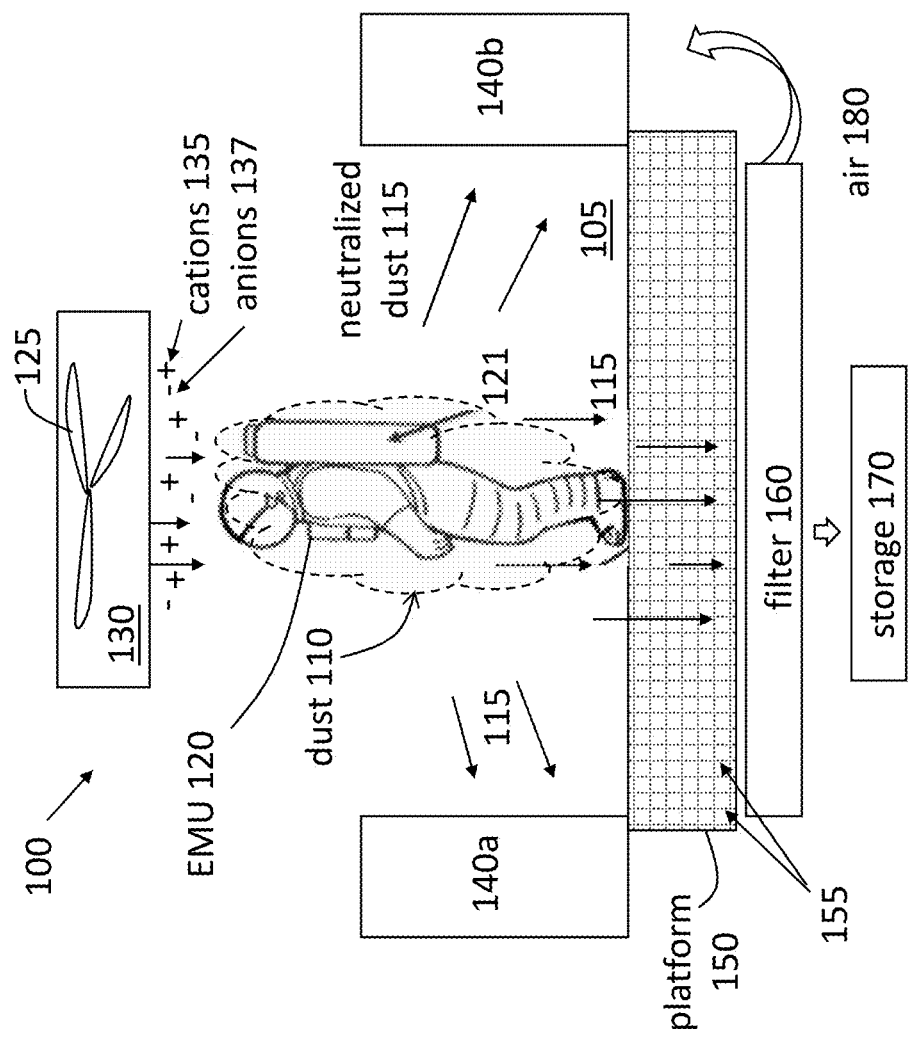
FIG. 1 shows an exemplary system to remove dust in a deep space environment according to one or more embodiments.
Figure 6:
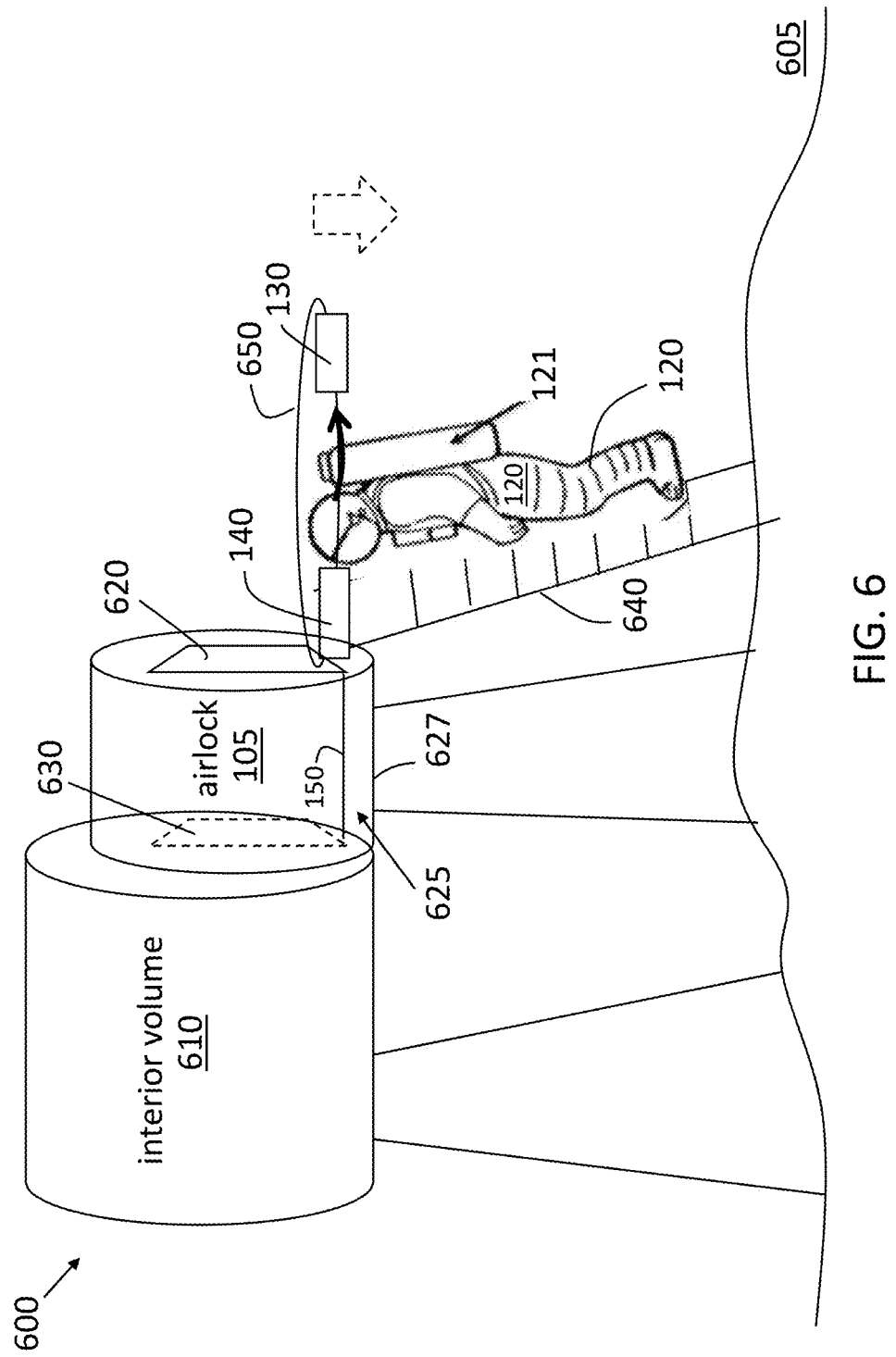
FIG. 6 shows relevant aspects of an exemplary facility including dust removal in a deep space environment according to one or more embodiments.

FIG. 1 shows an exemplary system 100 to remove dust 105 in a deep space environment according to one or more embodiments. The exemplary system 100 may be in an airlock 105 of a facility 600 (FIG. 6). According to alternate embodiments, the facility 600 may be a space vehicle or habitat in a deep space environment. As shown in FIG. 6, the airlock 105 is a space between an exterior hatch 620 leading outside to a surface 605 of the planet (e.g., Moon, Mars) and an interior hatch 630 leading into the interior volume 610 of the facility 600 (e.g., space vehicle, habitat). An astronaut wearing an exemplary EMU 120 is shown in the airlock 105. As indicated, the EMU 120 may include a pack 121 with oxygen tanks and power systems, boots, and a helmet in addition to a full body suit. Dust 110 is indicated on and around the EMU 120. The negatively and/or positively charged dust 110 may have become attached to the EMU 120 during extravehicular activity on the surface 605 of the planet (e.g., Moon, Mars). The system 100 ensures that the dust 110 is removed from the EMU 120 and captured so that it does not make its way into the interior volume 610 of the facility 600 when the interior hatch 630 is opened to allow the astronaut to enter.

An exemplary ionic shower unit 130 is shown above the astronaut. Ion generation is well-known and not detailed herein. Several types are described, for example, in U.S. Pat. No. 4,713,724. Generally, a magnetic field is created between two electrodes, and material (e.g., air) flowing through the magnetic field is ionized. Negatively charged ions (i.e., anions 137) and positively charged ions (i.e., cations 135) are generated. While some known ion generators create a localized ionic discharge, the ionic shower unit 130 includes a fan 125 to direct the flow of cations 135 and anions 137 to the EMU 120, as shown. When the airlock 105 is first entered, it is essentially a vacuum which is then filled with gases (e.g., oxygen $O_2$, nitrogen $N_2$, carbon dioxide $CO_2$). According to one or more embodiments, the inflow of these gases may be through the electric field created by the one or more ionic shower units 130.

The ionic shower unit 130 shown in FIG. 1 may be disposed in a ceiling of the airlock 105, for example. However, the number and placement of ionic shower units 130 is not intended to be limited by this exemplary illustration. For example, ionic shower units 130 may be located on the sides above the collection units 140a, 140b (generally referred to as 140). Additional alternate exemplary embodiments are discussed with reference to FIGS. 3, 5, and 6. The cations 135 from the ionic shower unit 130 neutralize the negatively charged dust 110 in the case of lunar dust. The anions 137 are not needed in the exemplary case of lunar dust and fall along with some of the neutralized dust 115. According to another example, the cations 135 and the anions 137 from the ionic shower unit 130 respectively neutralize the negatively and positively charged particles of Martian dust to generate neutralized dust 115. The resulting neutralized dust 115 may be captured in one of two different ways according to one or more embodiments detailed herein.

As more clearly shown in FIG. 6, the astronaut stands on a platform 150 that is raised above the floor 627 of the airlock 105, thereby creating a space 625 below the platform 150 and the floor 627. The platform 150 may be a grating or other surface with openings 155. The neutralized dust 115 that falls from the EMU 120 may fall through the openings 155 in the platform 150. A filter 160 below the platform 150 (i.e., in the space 625) may catch the dust particles to be collected in storage 170 while the filtered air 180 that is free of the dust particles is recirculated. The particles in storage 170 may ultimately be disposed of or retained for analysis.

In addition to falling through the platform 150, neutralized dust 115 may be trapped by one or more collection units 140. While two collection units 140a, 140b are shown on opposite sides of the airlock 105 in FIG. 1, the exemplary number and arrangement of the collection units 140 is not intended to be limiting. One or more collection units 140 may be placed below the platform 150 along with the filter 160, for example. Other embodiments are discussed with reference to FIGS. 4-6. An exemplary type of collection unit 140 is detailed with reference to FIG. 2. In addition to collecting neutralized dust 115 that is created by the ionic shower unit 110, the collection units 140 may also collect neutral dust that may be present on the EMU 120 (e.g., non-electrostatically charged dust from a planet surface).

Figure 2:
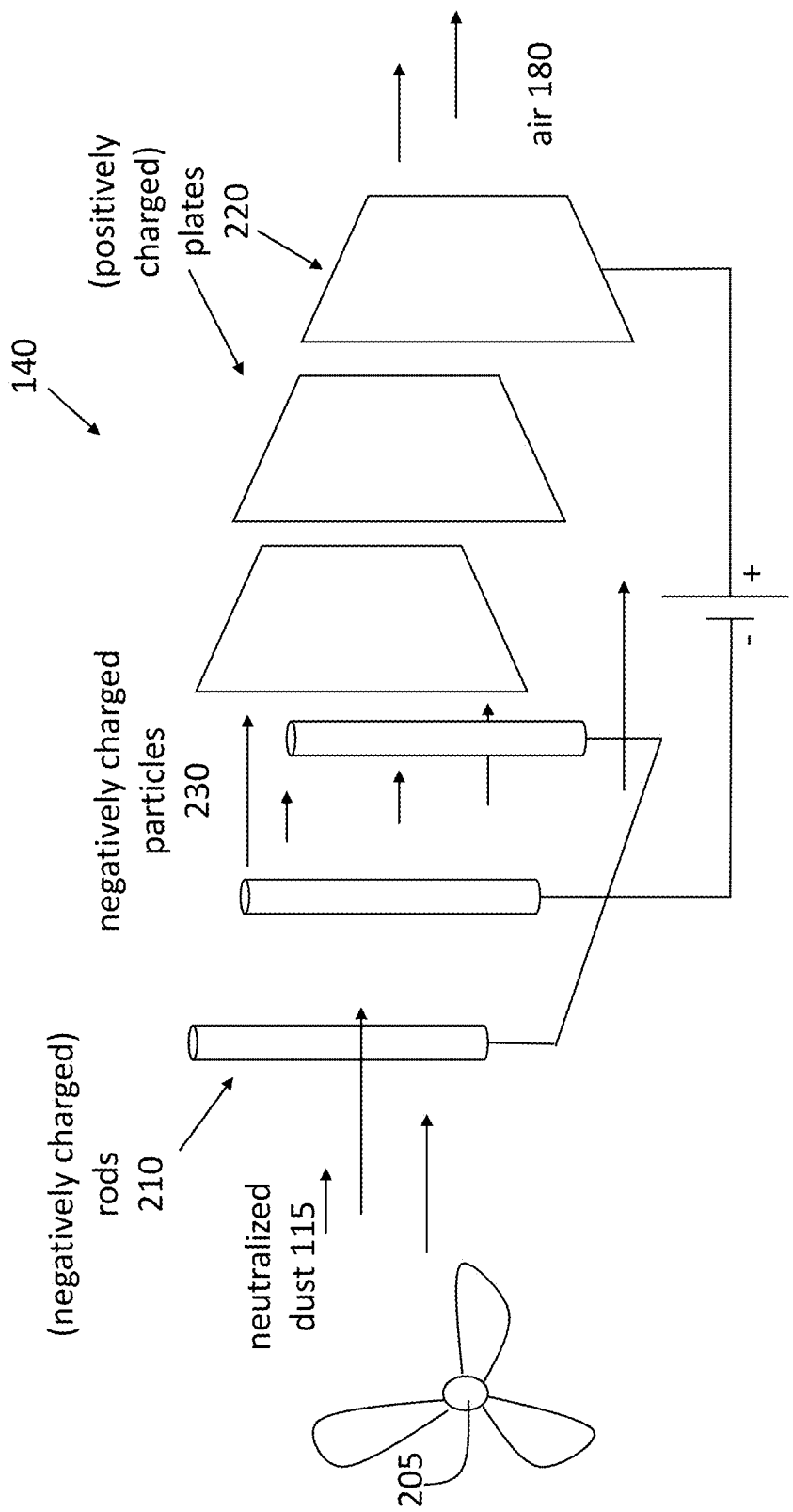
FIG. 2 is an exemplary embodiment of a collection unit for neutralized dust.

FIG. 2 is an exemplary embodiment of a collection unit 140 for neutralized dust 115. A fan 205 may be used to draw neutralized dust 115 into the collection unit 140. That is, the fan 205 may have a reverse flow as compared with the fan 125 that expels cations 135 and anions 137 in a specified direction from the ionic shower unit 130. The application of a charge between a set of rods 210 and plates 220, as indicated, ionizes the air around the rods 210 and charges the plates 220. This, in turn, ionizes (negatively charges) the neutralized dust 115 that flows through the rods 210, creating negatively charged particles 230. The negatively charged particles 230 adhere to the positively charged plates 220, leaving dust-free air 180.

Figure 3:
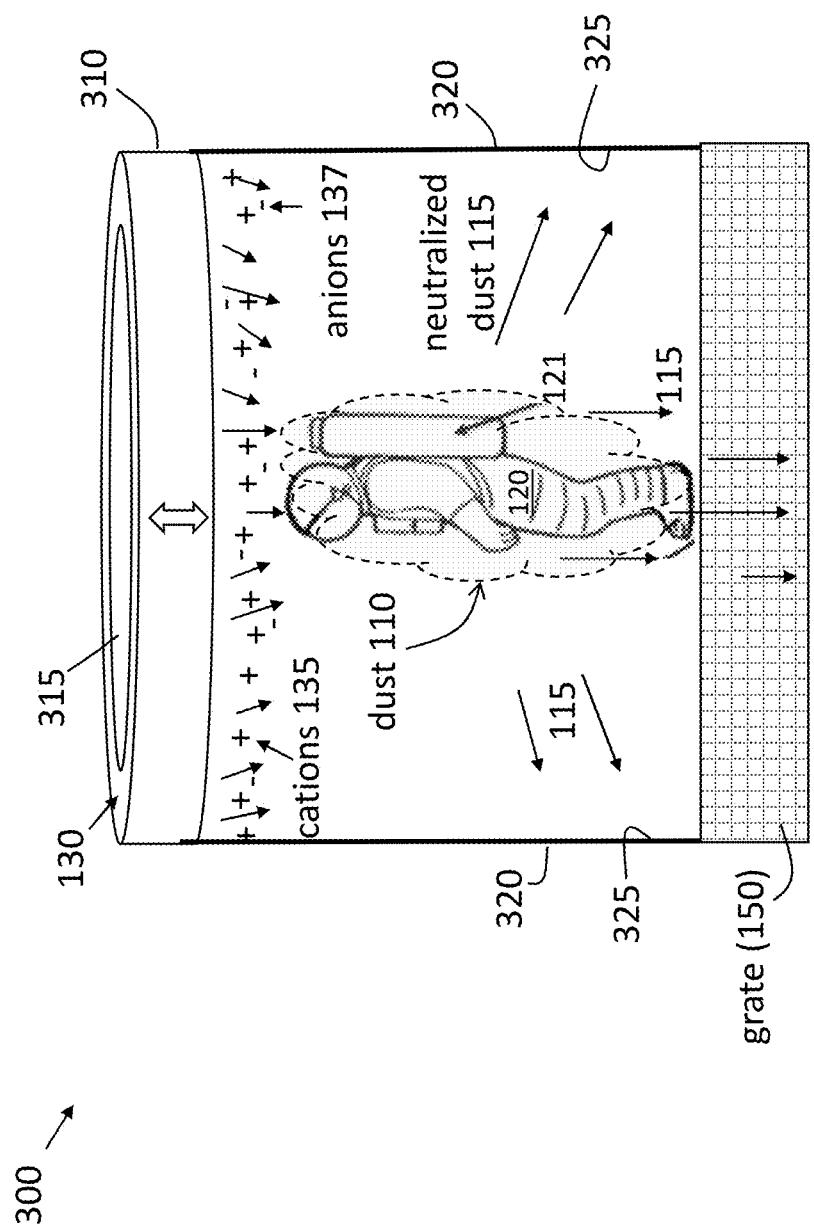
FIG. 3 is an exemplary embodiment of a system to remove dust in a deep space environment according to one or more embodiments.

FIG. 3 is an exemplary embodiment of a system 300 to remove dust 105 in a deep space environment according to one or more embodiments. As shown a ring-shaped support 310 includes one or more ionic shower units 130. One ionic shower unit 130 may span the circumference of the ring-shaped support 310 or multiple ionic shower units 130 may be disposed around the ring-shaped support 310. According to a further exemplary embodiment, the ring-shaped support 310 that holds one or more ionic shower units 130 may move up and down. As shown, the ring-shaped support 310 is sized such that the opening 315 accommodates the astronaut. The ring-shaped support 310 may be supported on opposite-side walls 320 of the airlock 105, for example. The ring-shaped support 310 may be supported on tracks 325 such that it moves down the walls 320 along the length of the EMU 120 to emit the cations 135 along the length of the EMU 120. While not shown, one or more collection units 140 and the filter 160 may be present, as shown in FIG. 1, for example, to collect the neutralized dust 115 created by the ionic shower unit 130.

Figure 4:
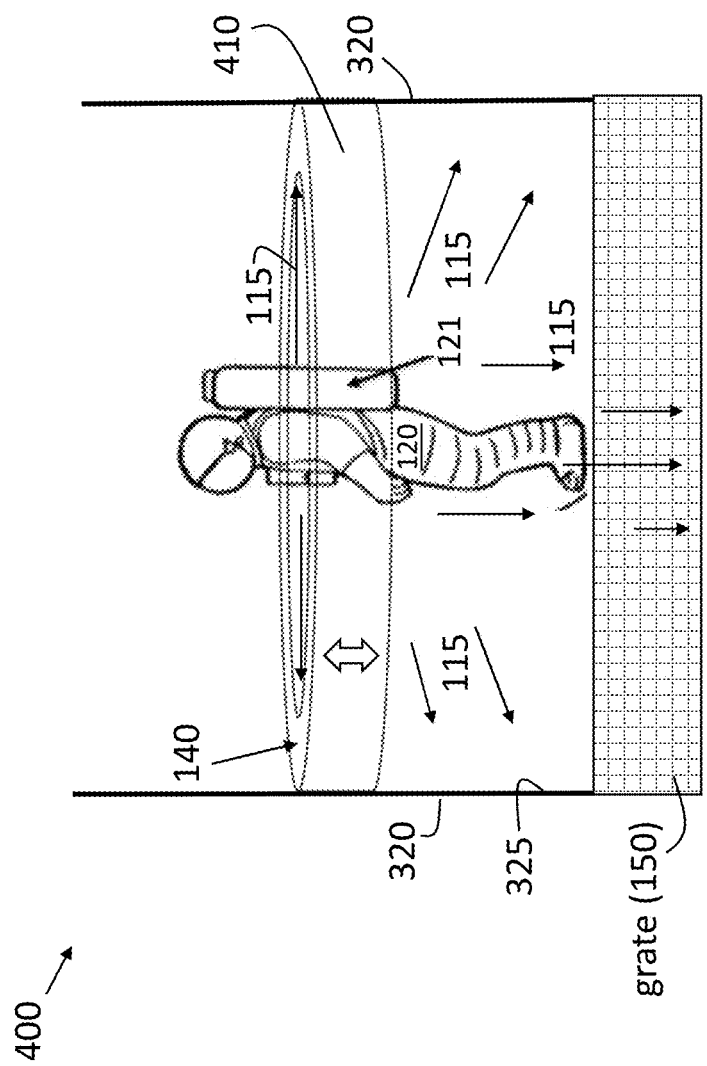
FIG. 4 is an exemplary embodiment of a system to remove dust in a deep space environment according to one or more embodiments.

FIG. 4 is an exemplary embodiment of a system 400 to remove dust 105 in a deep space environment according to one or more embodiments. As shown in FIG. 3, a ring-shaped support 410 may be supported on opposite-side walls 320 of the airlock 105, for example. The ring-shaped support 410 may include one or more collection units 140 and may be mounted on tracks 325 to move up and down along the walls 320. The ring-shaped support 410 may be additional to the ring-shaped support 310 shown in FIG. 3. For example, the ring-shaped support 310 may be lower than the ring-shaped support 410 to neutralize dust 110 with the one or more ionic shower units 130 in the ring-shaped support 310 before neutralized dust 115 is collected by one or more collection units 140 in the ring-shaped support 410. Alternately, one ring-shaped support 310 or 410 may include both one or more ionic shower units 130 and one or more collection units 140.

Figure 5:
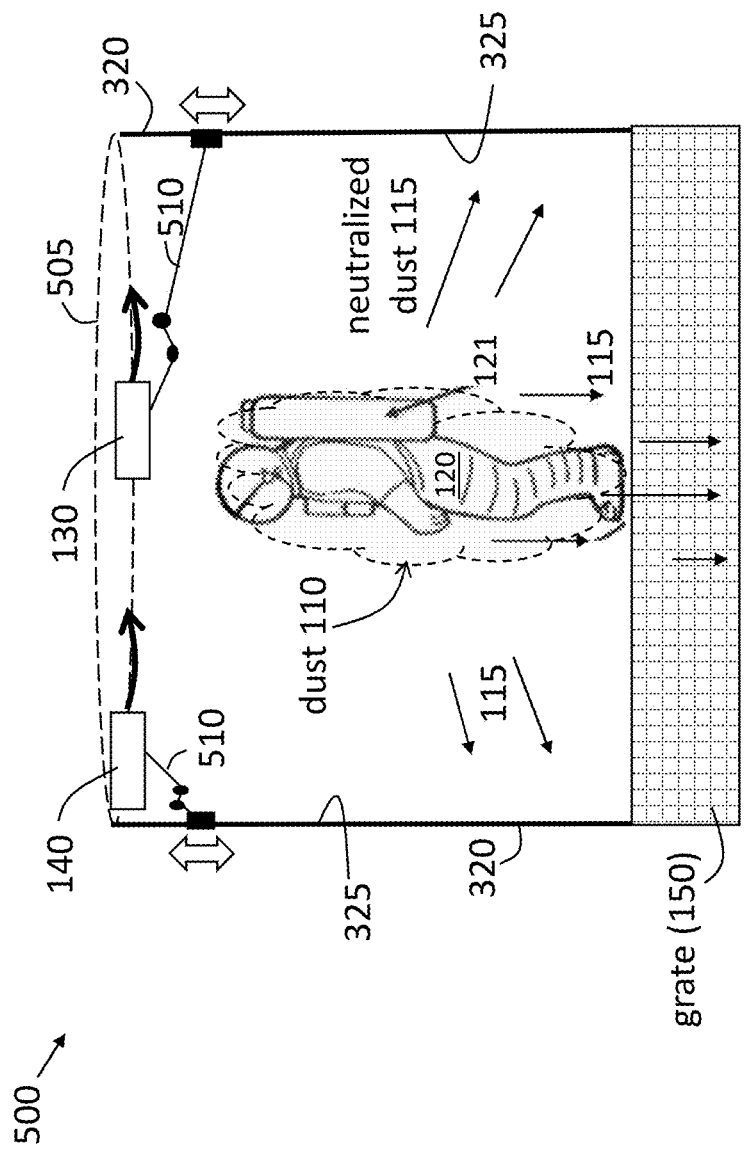
FIG. 5 is an exemplary embodiment of a system to remove dust according to one or more embodiments.

FIG. 5 is an exemplary embodiment of a system 500 to remove dust 105 according to one or more embodiments. Two swing arms 510 are shown affixed to the walls 320 of the airlock 105, for example. One swing arm 510 is shown supporting an ionic shower unit 130 and the other is shown supporting a collection unit 140. A circular path 505 is shown for both the ionic shower unit 130 and the collection unit 140 based on movement of the swing arms 510. According to additional embodiments, the swing arms 510 may move along tracks 325 mounted on the walls 320 to move the ionic shower unit 130 and the collection unit 140 up and down. While both the ionic shower unit 130 and the collection unit 140 are shown supported by swing arms 510, only one swing arm 510 may support the ionic shower unit 130 or the collection unit 140. Alternately, multiple swing arms 510 may support multiple ionic shower units 130 or multiple swing arms 510 may support multiple collection units 140.

FIG. 6 shows relevant aspects of an exemplary facility 600 including dust removal in a deep space environment according to one or more embodiments. As previously noted, the facility 600 may be a space vehicle or habitat on another plant. An airlock 105 is shown between an interior hatch 630 leading into the interior volume 610 and an exterior hatch 620 leading outside the facility 600. A ladder 640 is shown to provide access to the exterior hatch 620 from the surface 605. The platform 150 and the space 625 between it and the floor 627 are indicated. According to the exemplary embodiment shown in FIG. 6, an ionic shower unit 130 and a collection unit 140 may be affixed to a track 650 affixed to the ladder 640. According to alternate embodiments, any of the exemplary systems 300, 400, 500 may be implemented at the ladder 640 to remove dust 110 prior to the astronaut reaching the exterior hatch 620. Unlike the embodiments shown in the airlock 105, any system affixed to the ladder 640 may be part of a temporary setup. For example, when the facility 600 is a space vehicle, dust removal apparatus may be set up upon landing on the surface 605 and removed prior to leaving.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system to remove dust from an extravehicular mobility unit (EMU) worn by an astronaut in a deep space environment, the system comprising:
    one or more ionic shower units installed external to an interior volume of a facility, each ionic shower unit being configured to release positively charged ions and negatively charged ions in a specified direction to neutralize the dust and generate neutralized dust, wherein the interior volume of the facility is defined by an interior hatch that is separated from an exterior hatch by an airlock; and
    one or more collection units installed external to the interior volume, each collection unit being configured to trap the neutralized dust to prevent the dust from entering the interior volume.

2. The system according to claim 1, wherein the system is located in the airlock between the interior hatch and the exterior hatch of the facility and the facility is a space vehicle or a habitat.

3. The system according to claim 2, further comprising a filter in a space between a raised platform with openings on which the astronaut stands and the floor of the airlock.

4. The system according to claim 3, wherein the filter in the space is configured to recirculate air and to trap the neutralized dust.

5. The system according to claim 2, wherein the one or more ionic shower units or the one or more collection units are installed in a ring-shaped support whose opening is sized to encircle the astronaut.

6. The system according to claim 5, wherein the ring-shaped support is configured to move up and down to release the positively charged ions and the negatively charged ions along a length of the EMU or to trap the neutralized dust along the length of the EMU.

7. The system according to claim 2, wherein the one or more ionic shower units or the one or more collection units are installed on a swing arm to move around the EMU.

8. The system according to claim 7, wherein the one or more ionic shower units or the one or more collection units installed on the swing arm are also configured to move up and down.

9. The system according to claim 1, wherein the system is located external to the exterior hatch of the facility.

10. The system according to claim 9, wherein the system is affixed to a ladder leading to the exterior hatch to prevent the dust from entering the airlock.

11. A method of removing lunar dust from an extravehicular mobility unit (EMU) worn by an astronaut in a deep space environment, the method comprising:
installing one or more ionic shower units external to an interior volume of a facility, each ionic shower unit being configured to release positively charged ions and negatively charged ions in a specified direction to neutralize the lunar dust and generate neutralized dust, wherein the interior volume of the facility is defined by an interior hatch that is separated from an exterior hatch by an airlock; and
installing one or more collection units external to the interior volume, each collection unit being configured to trap the neutralized dust to prevent the neutralized dust from entering the interior volume.

12. The method according to claim 11, further comprising installing in the airlock between the interior hatch and the exterior hatch of the facility, the facility being a space vehicle or a habitat.

13. The method according to claim 12, further comprising disposing a filter in a space between a raised platform with openings on which the astronaut stands and the floor of the airlock.

14. The method according to claim 13, further comprising configuring the filter to recirculate air and to trap the neutralized dust.

15. The method according to claim 12, wherein the installing the one or more ionic shower units or the one or more collection units is in a ring-shaped support whose opening is sized to encircle the astronaut.

16. The method according to claim 15, further comprising configuring the ring-shaped support to move up and down to release the positively charged ions and the negatively charged ions along a length of the EMU or to trap the neutralized dust along the length of the EMU.

17. The method according to claim 12, wherein the installing the one or more ionic shower units or the one or more collection units on a swing arm to move around the EMU.

18. The method according to claim 17, further comprising configuring the swing arm to move up and down.

19. The method according to claim 11, wherein the one or more ionic shower units and the one more ionic collection units are installed external to the exterior hatch of the facility.

20. The method according to claim 19, further comprising affixing a ladder leading to the exterior hatch.

* * * * *